United States Patent
Kamei et al.

(10) Patent No.: US 6,791,701 B2
(45) Date of Patent: Sep. 14, 2004

(54) IMAGE FORMING APPARATUS HAVING COPY MODE AND PRINTER MODE

(75) Inventors: Nobuo Kamei, Toyokawa (JP); Hideyuki Toriyama, Toyokawa (JP); Hiroyuki Suzuki, Toyokawa (JP); Tsuyoshi Yoneyama, Toyokawa (JP); Hideaki Mizuno, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 834 days.

(21) Appl. No.: 09/727,507

(22) Filed: Dec. 4, 2000

(65) Prior Publication Data

US 2002/0015170 A1 Feb. 7, 2002

(30) Foreign Application Priority Data

Dec. 8, 1999 (JP) .......................................... 11-348607

(51) Int. Cl.[7] ............................ G06F 3/12; G06F 13/00
(52) U.S. Cl. ...................... 358/1.13; 358/1.16; 358/1.17
(58) Field of Search ............................... 358/1.13, 1.6, 358/1.9, 1.14, 1.15, 1.16, 1.17, 1.18, 523, 524, 530, 403, 404

(56) References Cited

U.S. PATENT DOCUMENTS 5,839,837 A * 11/1998 Takehara ..................... 400/76
5,861,890 A * 1/1999 Sakai et al. .................. 345/619
6,459,496 B1 * 10/2002 Okazawa .................... 358/1.14

FOREIGN PATENT DOCUMENTS

EP          862 322 A2     9/1998     .......... H04N/5/225

* cited by examiner

Primary Examiner—Gabriel Garcia
Assistant Examiner—Douglas Tran
(74) Attorney, Agent, or Firm—Burns Doane, Swecker & Mathis, L.L.P.

(57) ABSTRACT

An image forming apparatus capable of realizing reduction in circuit scale by effectively using memory and hardware resources. The image forming apparatus is operable selectively between in two operation modes, a copy mode and a printer mode, and includes a plurality of VRAMs, a VRAM control circuit for controlling data storage and reading into and from the VRAMs, a controller for controlling an operation of the VRAM control circuit, a display for displaying an image, and an interface for inputting data transmitted from an external apparatus. The controller rearranges wiring of a gate array of a device in the VRAM control circuit according to the operation mode, thereby switching at least one of the VRAMs so as to act as a memory for storing image data for displaying an image on the display or as a buffer for temporarily storing data input through the interface.

9 Claims, 4 Drawing Sheets

IMAGE FORMING APPARATUS HAVING COPY MODE AND PRINTER MODE

This application is based on Japanese Patent Application No. Hei 11-348607 filed in Japan on Dec. 8, 1999, the entire content of which is hereby incorporated by reference.

BACKGROUND OF THE INVENTION

1. Field of the Invention

The present invention relates to an image forming apparatus having a copy mode and a printer mode.

2. Description of the Related Art

An image forming apparatus such as a digital copier reads an original to obtain image data, performs various processings on the obtained image data to convert it into print data, and prints the image of the original onto a sheet based on the print data. This operation is called a copy mode.

Some image forming apparatuses have a printer mode as well as the copy mode. In the printer mode, data transmitted from an external apparatus such as a personal computer is input, and an image is printed onto a sheet based on the input data. Image forming apparatuses having the printer mode have an external input interface for inputting data from external apparatuses.

In recent years, it has been required to effectively use memory and hardware resources in image forming apparatuses. Some image forming apparatuses have a panel display processing section for displaying images in a panel display section. Such image forming apparatuses require a VRAM for storing images. Image forming apparatuses having the printer mode require a buffer memory for temporarily storing data from an external apparatus which data is input through the external input interface.

OBJECT AND SUMMARY

An object of the present invention is to provide an improved image forming apparatus that solves the above-mentioned problems.

Another object of the present invention is to provide an image forming apparatus in which reduction in circuit scale can be realized by effectively using memory and hardware resources.

These objects are achieved by providing an image forming apparatus capable of operating selectively between in the two operation modes, the copy mode and the printer mode, and comprising:

a plurality of VRAMs for storing image data;

a VRAM control circuit for controlling data storage and reading into and from the VRAMs;

a controller for controlling an operation of the VRAM control circuit;

a display for displaying an image based on image data transmitted from the VRAM control circuit; and an interface for inputting data transmitted from an external apparatus, wherein the VRAM control circuit has a device in which wiring of a gate array is rearrangeable based on supplied structure information, and the controller rearranges the wiring of the gate array of the device in the VRAM control circuit according to the operation mode, thereby switching at least one of the VRAMs so as to act as a memory for storing image data for displaying an image on the display or as a buffer for temporarily storing data input through the interface.

In the image forming apparatus, in the copy mode, the controller may rearrange the wiring of the gate array of the device in the VRAM control circuit so that all the VRAMs act as memories for storing image data for displaying an image on the display.

Moreover, in the image forming apparatus, in the printer mode, the controller may rearrange the wiring of the gate array of the device in the VRAM control circuit so that at least one of the VRAMs acts as a buffer for temporarily storing data input through the interface.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENT

Hereinafter, a preferred embodiment of the present invention will be described with reference to the accompanying drawings.

Figure 1:
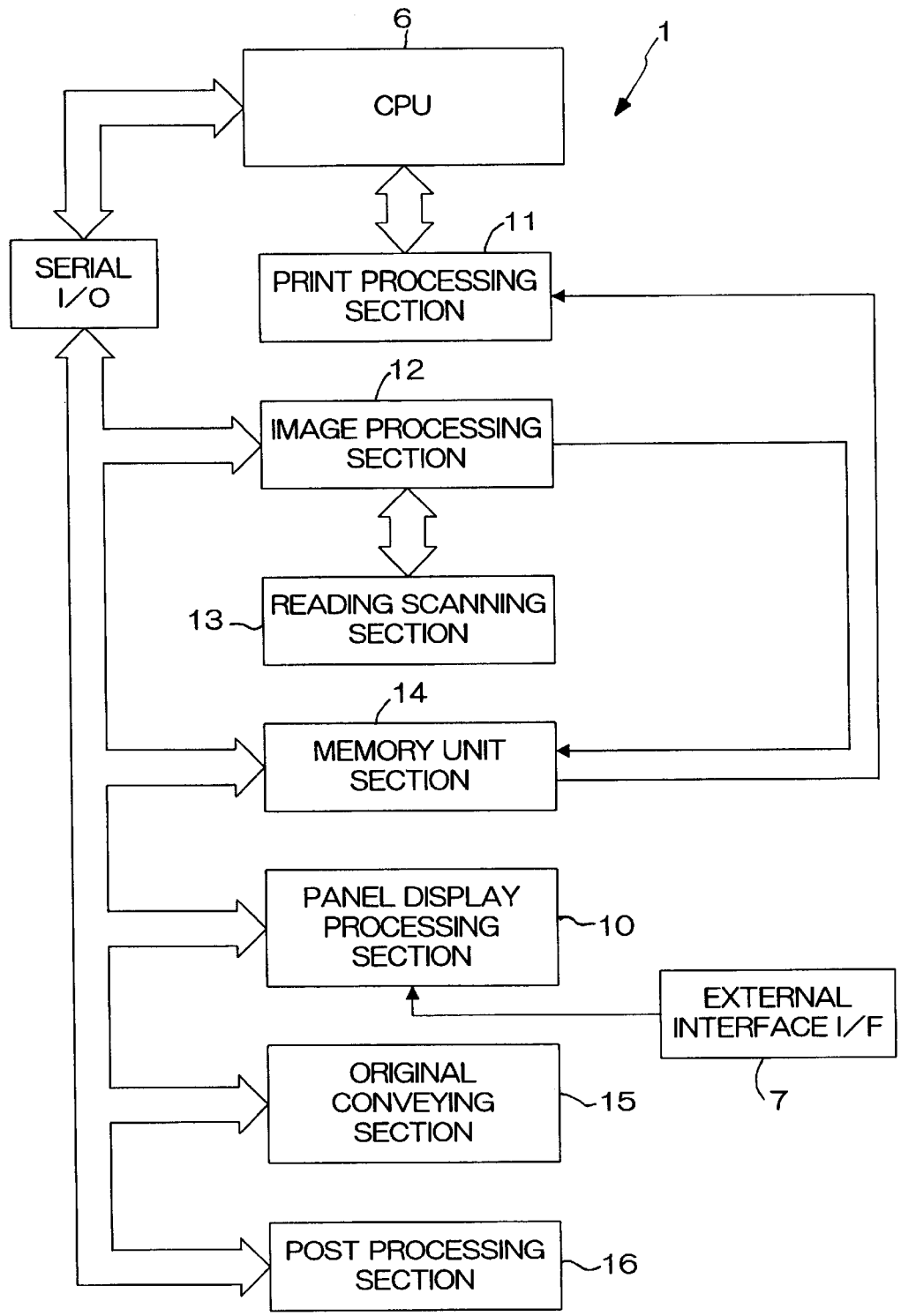
FIG. 1 is a block diagram schematically showing the structure of an image forming apparatus according to an embodiment of the present invention.

FIG. 1 schematically shows the structure of an image forming apparatus according to an embodiment of the present invention. An image forming apparatus 1 has the copy mode and the printer mode, and is capable of operating selectively between in these modes. The image forming apparatus 1 has as its basic elements a memory unit section 14 for storing various data and programs, a print processing section 11 for printing the image data in the memory unit section 14 onto a recording medium such as paper in a format such as character or graphic information, a reading scanning section 13 for scanning an original to convert it into electric data, an image processing section 12 for performing various processings on the image data read by the reading scanning section 13 by use of the memory unit section 14, a panel display processing section 10 for outputting the image data to a panel display section 5 (see FIGS. 2 and 3) as visible analog information, an original conveying section 15 for conveying the original, a postprocessing section 16, and a CPU 6 for controlling the operations of these sections. These elements are connected to one another through a serial bus, and perform work while transmitting and receiving data and programs, thereby realizing a copy function.

The image forming apparatus 1 is capable of receiving image data transmitted from an external apparatus such as a personal computer in the printer mode. The received image data is input to the memory unit section 14, and is printed by the print processing section 11. In this embodiment, an external interface 7 (in the figure, denoted as external I/F) through which data from the external apparatus is input is disposed on the same substrate as the panel display processing section 10 which is one of the basic elements of the apparatus 1.

Figure 2:
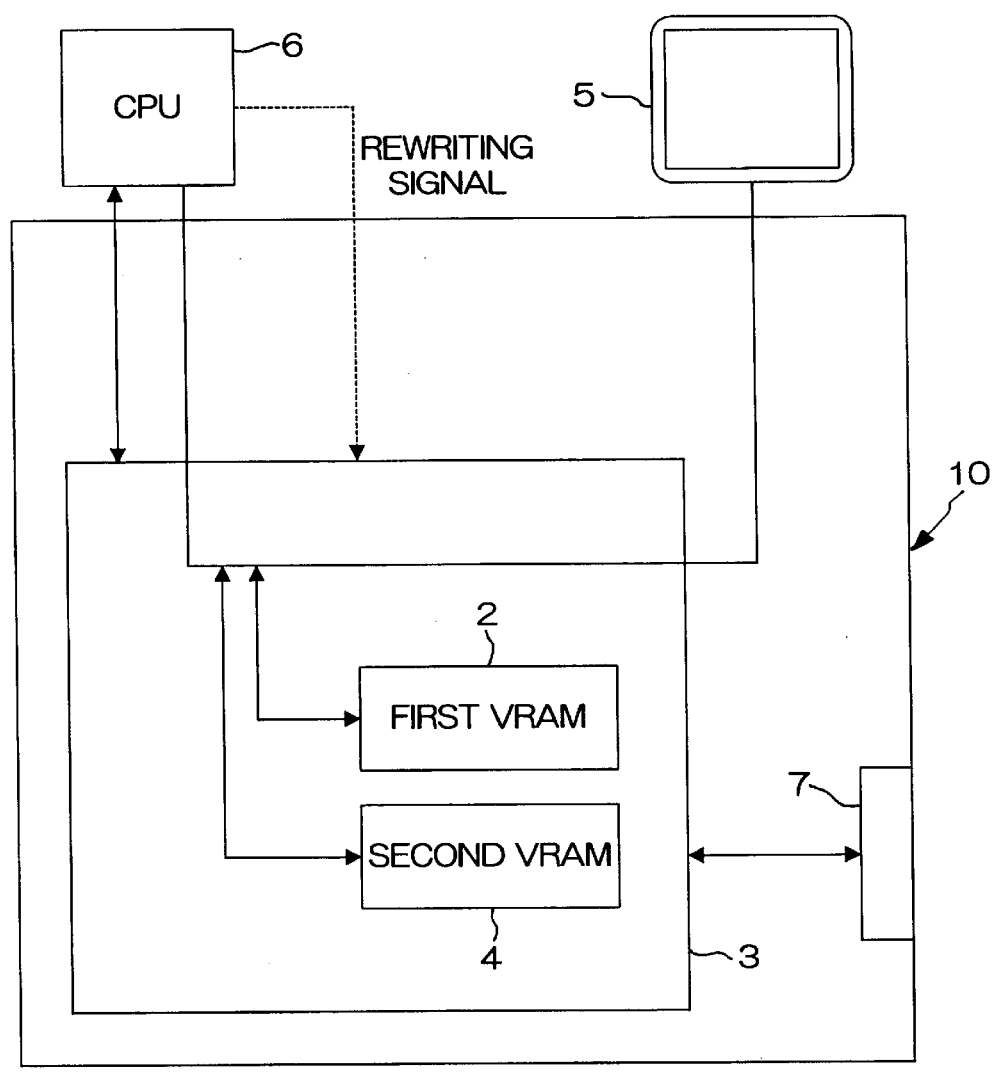
FIG. 2 is an explanatory view showing the allocation of VRAMs in the copy mode in the image forming apparatus according to the embodiment of the present invention.
Figure 3:
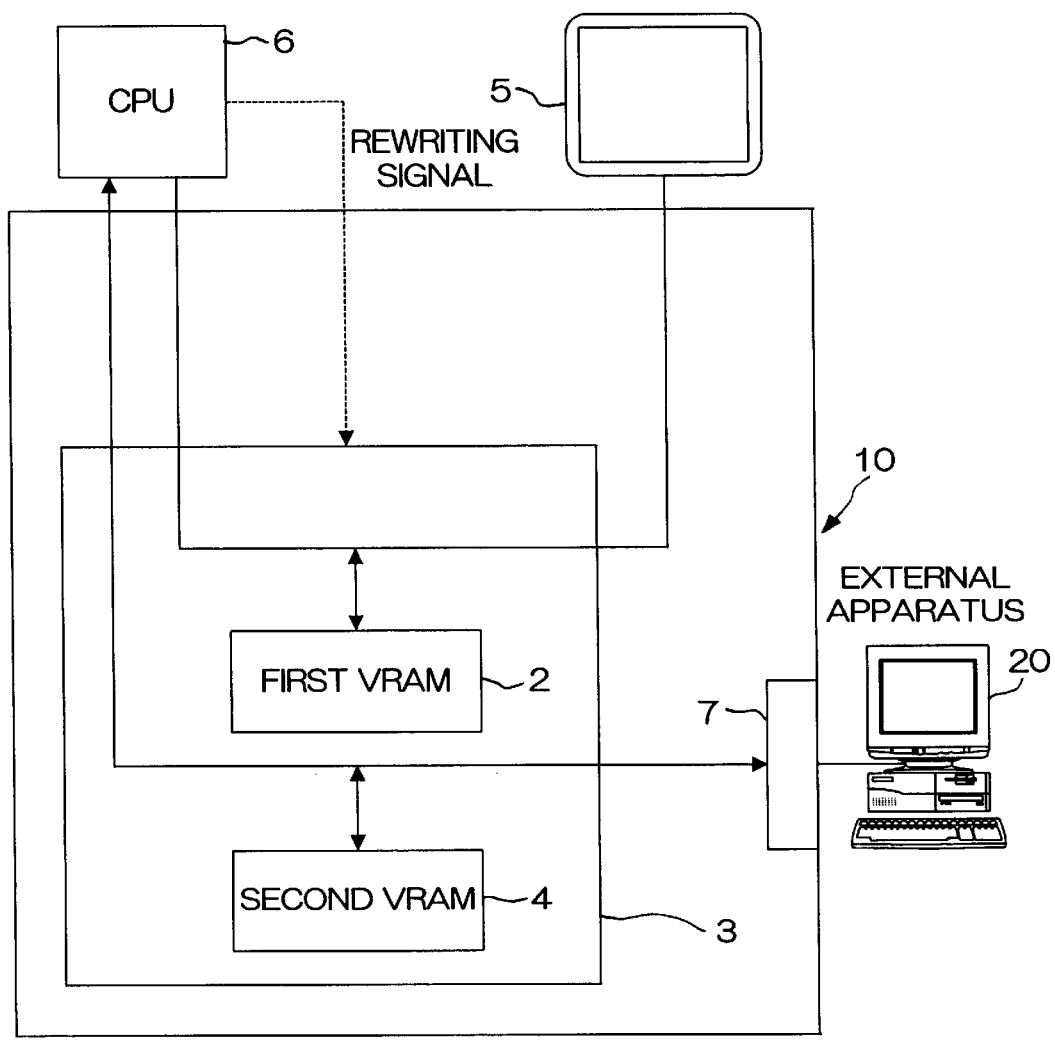
FIG. 3 is an explanatory view showing the allocation of the VRAMs in the printer mode in the image forming apparatus.

FIGS. 2 and 3 show the structure of the panel display processing section 10 in detail. The panel display processing section 10 has a first VRAM 2 and a second VRAM 4 for storing image data, and a VRAM control circuit 3 for controlling data storage and reading into and from the first and second VRAMs 2 and 4. The first and second VRAMs 2 and 4 are equal in storage capacity. The image data stored in the first and second VRAMs 2 and 4 is output to the panel display section 5 of, for example, a liquid crystal type through the VRAM control circuit 3, so that an image is displayed on the panel display section 5. In this embodiment, the external interface 7 through which data from the external apparatus (see FIG. 3) is input is connected to the VRAM control circuit 3.

The VRAM control circuit 3 has a device in which the wiring of the gate array can be rearranged based on supplied structure information. In this embodiment, a known writable gate array (so-called FPGA (field programmable gate array)) is used as such a device. Since the FPGA is known, detailed description of its circuit structure is omitted. According to the FPGA, a desired logic can be realized by regularly arranging programmable logic modules, providing wiring areas therebetween and connecting the logic modules and the wiring areas according to the structure information. Consequently, the wiring of the gate array of the FPGA in the VRAM control circuit 3 is rearranged based on the supplied structure information, so that the control specifications of the first and second VRAMs 2 and 4 are arbitrarily set.

In the image forming apparatus 1, switching between the copy mode and the printer mode can be made according to the use. The wiring of the gate array of the FPGA in the VRAM control circuit 3 in the panel display processing section 10 is rearranged according to the mode, so that the first and second VRAMs 2 and 4 are controlled according to different specifications.

FIG. 2 shows the control specifications of the first and second VRAMs 2 and 4 in the copy mode. In the copy mode, normally, data is frequently exchanged between the CPU 6 and the panel display section 5, for example, in order to display an image for preview on the panel display section 5. That is, the panel display section 5 is frequently used.

In consideration of the frequency in use of the panel display section 5 in the copy mode, the wiring of the gate array of the FPGA in the VRAM control circuit 3 is rearranged for the copy mode, so that the first and second VRAMs 2 and 4 are both controlled so as to store image data for the panel display section 5. In the rearrangement, the structure information is transferred from the CPU 6 to the VRAM control circuit 3 (in the figure, denoted as rewriting signal).

FIG. 3 shows the control specifications of the first and second VRAMs 2 and 4 in the printer mode. In this case, data is input from an external apparatus 20 connected to the image forming apparatus 1 through the external interface 7. In the printer mode, normally, only data constituting a command input screen, for example, is transferred to the panel display section 5 and data exchange between the CPU 6 and the panel display section 5 is not frequently performed. That is, the panel display section 5 is hardly used. In consideration of the frequency in use of the panel display section 5 in the printer mode, the wiring of the gate array in the VRAM control circuit 3 is rearranged for the printer mode, so that the first VRAM 2 is controlled so as to store the image data for the panel display section 5 and the second VRAM 4 is controlled so as to store the data input through the external interface 7.

As described above, in the panel display processing section 10, according to the frequencies in use of the panel display section 5 in the copy mode and in the printer mode, the wiring of the gate array in the VRAM control circuit 3 is rearranged to change the control specifications of the first and second VRAMs 2 and 4, thereby allocating the first and second VRAMs 2 and 4 as appropriate. Consequently, it is unnecessary to provide a memory and a control circuit used therefor for each purpose, so that the circuit scale can be comparatively small.

Moreover, in this case, a comparatively large capacity input buffer for the external interface 7 can be secured in the printer mode without any increase in the capacities of the on board memories, so that the data reception performance can be improved to increase the speed of data transfer from the external apparatus 20 connected to the apparatus body.

Figure 4:
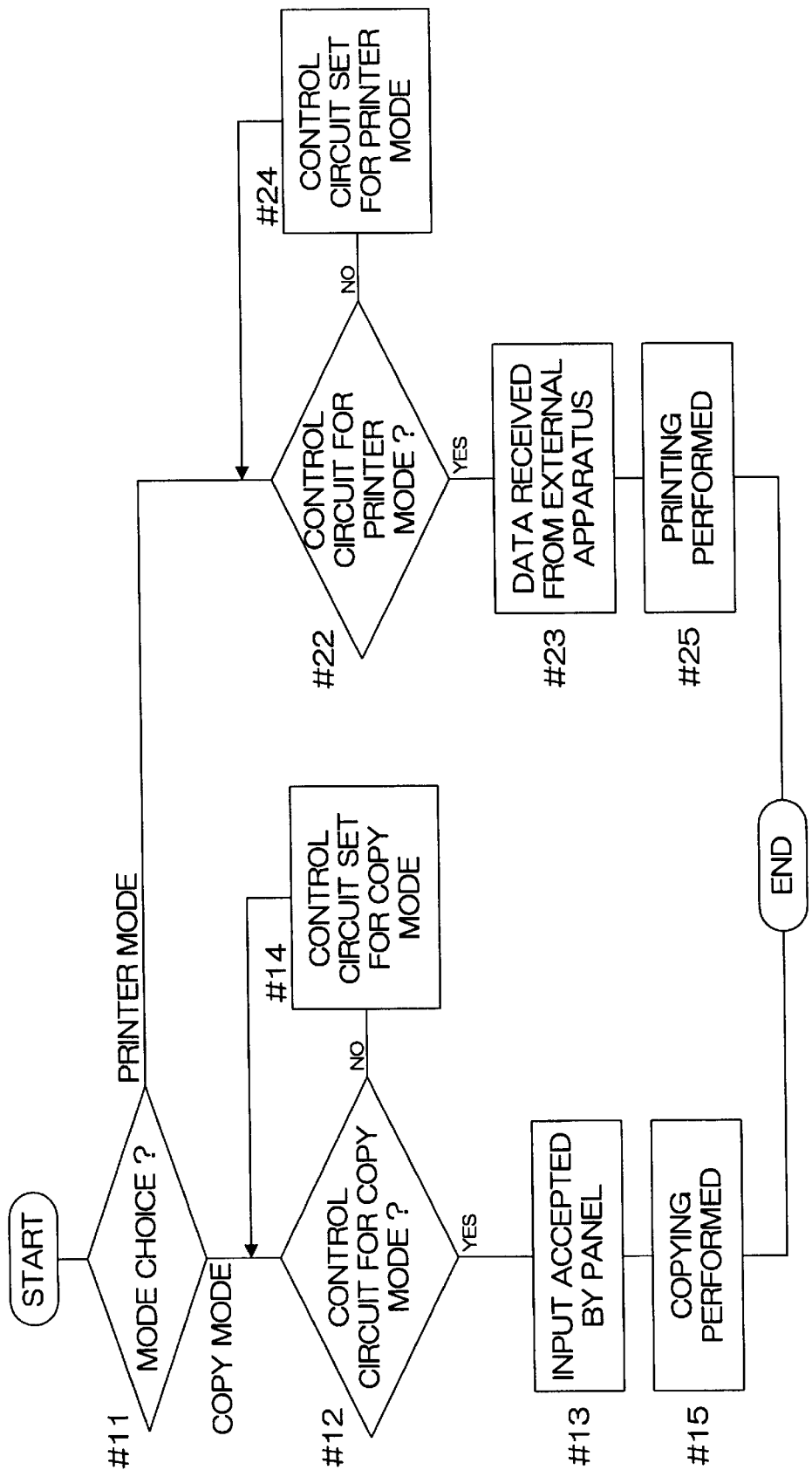
FIG. 4 is a flowchart of allocation of the VRAMs in accordance with the copy mode and the printer mode in the image forming apparatus.

FIG. 4 is a flowchart as to the allocation of the first and second VRAMs 2 and 4 in accordance with the copy mode and the printer mode in the panel display processing section 10.

After the image forming apparatus 1 is activated, either the printer mode or the copy mode is chosen according to the purpose by the user (#11). When the copy mode is chosen, the process proceeds to #12. When the printer mode is chosen, the process proceeds to #22.

At #12, whether the VRAM control circuit 3 is set for the copy mode or not is determined. When the result is YES, the process proceeds to #13, where input is accepted by the panel display section 5 and an instruction as to copy is displayed on the panel display section 5. When the result at #12 is NO, the process proceeds to #14, where the circuit structure of the VRAM control circuit 3 is set for the copy mode. Then, the process again proceeds to #12.

Then, copying is performed at #15 and the copy process is finished.

At #22, whether the VRAM control circuit 3 is set for the printer mode or not is determined. When the result is YES, the process proceeds to #23, where data is received from the external apparatus 20 and an instruction as to a printer is displayed on the panel display section 5. When the result at #22 is NO, the process proceeds to #24, where the circuit structure of the VRAM control circuit 3 is set for the printer mode. Then, the process again proceeds to #22.

Then, printing is performed at #25 and the printer process is finished.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

For example, while the first and second VRAMs 2 and 4 are equal in storage capacity in the above-described embodiments, the present invention is not limited thereto. For example, the storage capacity of the second VRAM 4 may be larger than that of the first VRAM 2. In this case, a comparatively large capacity input buffer for the external interface can be sufficiently secured, so that the data reception performance can be improved to further increase the speed of data transfer from the external apparatus connected to the apparatus body.

What is claimed is:

1. An image forming apparatus capable of operating selectively between in two operation modes, a copy mode and a printer mode, the image forming apparatus comprising:

a plurality of VRAMs for storing image data;

a VRAM control circuit for controlling data storage and reading into and from the VRAMs;

a controller for controlling an operation of the VRAM control circuit;

a display for displaying an image based on image data transmitted from the VRAM control circuit; and an interface for inputting data transmitted from an external apparatus, wherein the VRAM control circuit has a device in which wiring of a gate array is rearrangeable based on supplied structure information, and the controller rearranges the wiring of the gate array of the device in the VRAM control circuit according to the operation mode, thereby switching at least one of the VRAMs so as to act as a memory for storing image data for displaying an image on the display or as a buffer for temporarily storing data input through the interface.

2. An image forming apparatus as claimed in claim 1, wherein said controller rearranges the wiring of the gate array of the device in the VRAM control circuit so that all the VRAMs act as memories for storing image data for displaying an image on the display in the copy mode.

3. An image forming apparatus as claimed in claim 1, wherein said controller rearranges the wiring of the gate array of the device in the VRAM control circuit so that at least one of the VRAMs acts as a buffer for temporarily storing data input through the interface in the printer mode.

4. An image forming apparatus as claimed in claim 1, wherein said controller rearranges the wiring of the gate array of the device in the VRAM control circuit so that all the VRAMs act as memories for storing image data for displaying an image on the display in the copy mode and so that at least one of the VRAMs acts as a buffer for temporarily storing data input through the interface in the printer mode.

5. An image forming apparatus as claimed in claim 1, wherein said device is a FPGA.

6. A method of controlling an operation of a VRAM control circuit in an image forming apparatus capable of operating selectively between in two operation modes, a copy mode and a printer mode, the image forming apparatus including a plurality of VRAMs for storing image data, the VRAM control circuit for controlling data storage and reading into and from the VRAMs, a display for displaying an image based on image data transmitted from the VRAM control circuit and an interface for inputting data transmitted from an external apparatus, said method comprising the steps of:

determining which the copy mode or the printer mode is set as the operation mode; and rearranging wiring of a gate array of a device in the VRAM control circuit according to the operation mode determined at the preceding step, thereby switching at least one of the VRAMs so as to act as a memory for storing image data for displaying an image on the display or as a buffer for temporarily storing data input through the interface.

7. A method as claimed in claim 6, wherein said rearranging step rearranges the wiring of the gate array of the device in the VRAM control circuit so that all the VRAMs act as memories for storing image data for displaying an image on the display when it is determined at the determining step that the operation mode is the copy mode.

8. A method as claimed in claim 6, wherein said rearranging step rearranges the wiring of the gate array of the device in the VRAM control circuit so that at least one of the VRAMs acts as a buffer for temporarily storing data input through the interface when it is determined at the determining step that the operation mode is the printer mode.

9. A method as claimed in claim 6, wherein said device is a FPGA.

* * * * *